(12) United States Patent
Zhou et al.

(10) Patent No.: US 9,613,662 B2
(45) Date of Patent: Apr. 4, 2017

(54) METHOD AND SYSTEM FOR OBTAINING MULTIMEDIA POINTS OF INTEREST, METHOD AND APPARATUS FOR PLAYING MULTIMEDIA, AND COMPUTER STORAGE MEDIUM

(71) Applicant: TENCENT TECHNOLOGY (SHENZHEN) COMPANY LIMITED, Shenzhen, Guangdong (CN)

(72) Inventors: Zhipeng Zhou, Shenzhen (CN); Huili Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 250 days.

(21) Appl. No.: 14/624,041

(22) Filed: Feb. 17, 2015

(65) Prior Publication Data
US 2015/0162050 A1 Jun. 11, 2015

Related U.S. Application Data

(63) Continuation of application No. PCT/CN2013/081496, filed on Aug. 14, 2013.

(30) Foreign Application Priority Data

Aug. 15, 2012 (CN) .......................... 2012 1 0290354

(51) Int. Cl.
*H04N 9/80* (2006.01)
*G11B 27/10* (2006.01)
(Continued)

(52) U.S. Cl.
CPC ............ *G11B 27/105* (2013.01); *G11B 27/28* (2013.01); *G11B 27/34* (2013.01); *H04N 5/783* (2013.01);
(Continued)

(58) Field of Classification Search
USPC ......................................... 386/241, 248, 291
See application file for complete search history.

(56) References Cited

U.S. PATENT DOCUMENTS

2005/0185918 A1* 8/2005 Lowe ................ G06F 17/30017
386/228
2010/0332565 A1* 12/2010 Al-Shaykh ........ G06F 17/30905
707/912

(Continued)

FOREIGN PATENT DOCUMENTS

CN 101345853 A 1/2009

OTHER PUBLICATIONS

Chinese Office Action dated Oct. 28, 2015 in corresponding Chinese Patent Application No. 201210290354.5 (8 pages).
(Continued)

*Primary Examiner* — Nigar Chowdhury
(74) *Attorney, Agent, or Firm* — Staas & Halsey LLP

(57) ABSTRACT

A method and apparatus for obtaining multimedia point of interest includes: obtaining a redirection request for multimedia, and collecting redirection time that is included in the redirection request; segmenting a time period of the multimedia with a predetermined interval, to be multiple time sections; obtaining a number of time sections that have most recorded redirection time; and recording time points that are corresponding to locations of recorded redirection times of the obtained number of time sections, thereby effectively reducing workload and improve efficiency for obtaining multimedia point of interest

19 Claims, 2 Drawing Sheets

(51) Int. Cl.
*H04N 21/472* (2011.01)
*H04N 21/845* (2011.01)
*H04N 5/783* (2006.01)
*G11B 27/28* (2006.01)
*H04N 5/85* (2006.01)
*G11B 27/34* (2006.01)

(52) U.S. Cl.
CPC ......... *H04N 5/85* (2013.01); *H04N 21/47217* (2013.01); *H04N 21/8456* (2013.01)

(56) References Cited

U.S. PATENT DOCUMENTS

| | | | | |
|---|---|---|---|---|
| 2014/0013342 A1* | 1/2014 | Swan | ................ | H04N 21/2343 725/5 |
| 2015/0363787 A1* | 12/2015 | Vasquez | ............... | G06Q 30/016 705/304 |
| 2016/0360284 A1* | 12/2016 | Kumar | ............... | H04N 21/6405 |

OTHER PUBLICATIONS

International Search Report (Form PCT/ISA/210) mailed on Nov. 21, 2013 in corresponding PCT Application No. PCT/CN2013/081496 (2 pages) (2 pages English Translation).

\* cited by examiner

METHOD AND SYSTEM FOR OBTAINING MULTIMEDIA POINTS OF INTEREST, METHOD AND APPARATUS FOR PLAYING MULTIMEDIA, AND COMPUTER STORAGE MEDIUM

CROSS-REFERENCE TO RELATED APPLICATIONS

The present application is a U.S. continuation application under 35 U.S.C. §111(a) claiming priority under 35 U.S.C. §§120 and 365(c) to International Application PCT/CN2013/081496, filed Aug. 14, 2013, and claims foreign priority to Chinese application 201210290354.5 filed Aug. 15, 2012, and which are incorporated herein by reference in their entireties.

FIELD OF THE INVENTION

The present invention relates to multimedia playback technology and particularly, relates to method and system for obtaining interest point for multimedia, apparatus and method for playing multimedia and computer storage medium thereof.

BACKGROUND OF THE INVENTION

Inevitably, part of the multimedia content is repeatable and prosaic. For instance, titles and credits of TV series, opening sections of variety shows, insipid parts of movies or TVs. For easily addressing to critical points (also called interest points) of multimedia, for example the ending points of the titles, the starting points of the credits, or the starting points of the highlights, the players usually label these points in the progress bars.

Typically, the interest points are manually obtained and configured. The time for the title, the credits, and the highlight is desired to be calculated, and the corresponding time points for these interest points are obtained. Each multimedia point of interest (correspondingly the time point of the multimedia contents for the playback) is stored. However, if time points for interest points are obtained manually, the manual configuration needs the multimedia contents to be watched in order to obtain the corresponding time point of interest, which causes the manual configuration time consuming and burdens the operation with too much work loads while lowers the efficiency.

Moreover, conventional method for playing multimedia contents manually sets the time points of interest when it is required to label the point of interest in the progress bar, which comes out to be inaccurate and further causes deviations when playing the multimedia contents.

SUMMARY OF THE INVENTION

Accordingly, it is necessary to provide a method for obtaining multimedia point of interest that can address the problem of the conventional manual configuration which consumes large workforces and lowers efficiency, and that can reduce the workload and improve the efficiency.

A method for obtaining a multimedia point of interest includes:
obtaining a redirection request for multimedia, and collecting redirection time that is included in the redirection request;
segmenting predetermined time period of the multimedia with predetermined interval to obtain multiple time sections;
obtaining predefined number of time sections that have the most recorded redirection time; and
recording time points that are corresponding to the predetermined locations of the obtained time sections.

Besides, it is provided a system for obtaining multimedia point of interest that includes a server, the server includes:
a collection module used for obtaining a redirection request for multimedia, and for collecting redirection time that is included in the redirection request;
a segment module used for segmenting predetermined time period of the multimedia with predetermined interval to obtain multiple time sections;
a statistics module used for obtaining predefined number of time sections that have the most recorded redirection time;
a record module used for recording time points that are corresponding to the predetermined locations of the obtained time sections.

Besides, it is provided a method for playing multimedia that can improve the accuracy of labelling point of interest.

The method for playing multimedia includes:
obtaining request for playing, wherein the request for playing includes a multimedia tag for the multimedia requested to be played;
obtaining time points that are corresponding to the obtained multimedia tag, and labelling positions corresponding to the time points on a progress bar;
playing the multimedia according to the request for playing;
wherein the time points are the recorded time points according to the above method for obtaining multimedia point of interest.

Besides, it is provided an apparatus for playing multimedia that can improve the accuracy of labelling point of interest.

An apparatus for playing multimedia includes:
an obtaining module used for obtaining request for playing, wherein the request for playing includes a multimedia tag for the multimedia requested to be played;
a labelling module used for obtaining time points that are corresponding to the obtained multimedia tag, and for labelling positions corresponding to the time points on a progress bar; and
a player module used for playing the multimedia according to the request for playing; wherein the time points are the recorded time points according to the above system for obtaining multimedia point of interest.

A non-transitory computer storage medium includes computer executable instruction, wherein the computer executable instruction is used for performing a method for playing multimedia; wherein the method includes:
obtaining request for playing, wherein the request for playing includes a multimedia tag for the multimedia requested to be played;
obtaining time points that are corresponding to the obtained multimedia tag, and labelling positions corresponding to the time points on a progress bar; and
playing the multimedia according to the request for playing;
wherein the time points are the recorded time points according to the above method for obtaining multimedia point of interest.

The above described method and system for obtaining multimedia point of interest collects multimedia redirection time that are contained in the obtained redirection requests; segments the predetermined time period of the multimedia with predetermined interval to be multiple time sections; obtains predefined number of time sections that have the most recorded redirection time; and records time points that are corresponding to the predetermined locations of the obtained time sections. Since the time sections that contains the more redirection time would indicate that the users are more interested in the contents of the corresponding multimedia time section, such time points that are corresponding to the predetermined locations of the obtained time sections would be the multimedia points of interest. The redirection time could be collected through obtaining the redirection request, since that the redirection time is included in the redirection requests that are uploaded through the player. There would not be needed to watch the multimedia contents beforehand, thereby reduces operational workloads and improves efficiency for obtaining the multimedia points of interest.

The method and apparatus for playing multimedia and computer storage medium thereof obtain time points that are corresponding to the multimedia tag. The time points are recorded time points according to the above mentioned method and system for obtaining multimedia point of interest. The time points are processed according to large amount of redirection time contained in the collected redirection requests, thereby have accountable accuracy, and the accuracy for labelling the point of interest could be improved.

DETAILED DESCRIPTION OF THE EMBODIMENTS

Figure 1:
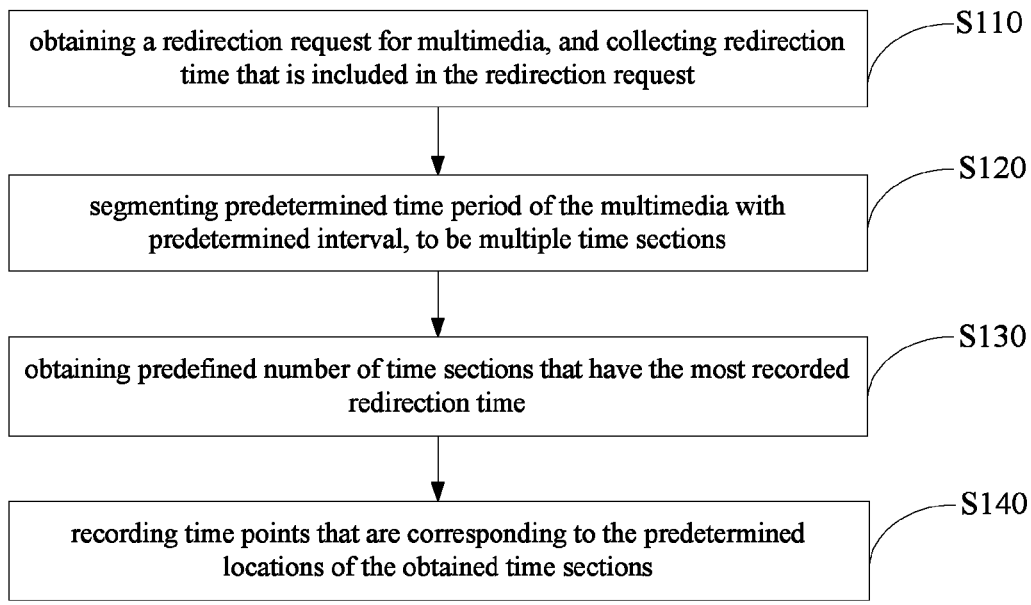
FIG. 1 is a flow diagram of a method for obtaining multimedia point of interest according to one of the embodiments.

Referring to FIG. 1, according to one embodiment, a method for obtaining multimedia point of interest includes the following steps.

Step S110, obtaining a redirection request for multimedia, and collecting redirection time that is included in the redirection request.

Specifically, the redirection request may be uploaded through the player. The redirection request may be generated through dragging the progress bar configured in the players, or be generated through obtaining an inputted redirection time. Moreover, the player obtains the time point on which the progress bar is dragged to, or obtains the redirection time that is inputted. The obtained time is used for labelling the redirection time, the redirection request contains the redirection time.

Furthermore, the redirection request may further contain multimedia tag. The player uploads the redirection request to a server, the server receives the redirection request and extracts the multimedia tag and the redirection time that is contained in the redirection request, and correspondingly stores the multimedia tag and the redirection time. It shall be appreciated that, the server would have obtained large amount of redirection requests; thereby the server have stored large amount of multimedia tags and large amount of redirection time data corresponding to the multimedia tags. Wherein, the multimedia tag is used for uniquely identifying a particular multimedia file, which could be a name of the multimedia, a digest of the multimedia, or an assigned tag number to the multimedia, etc.

According to an exemplary embodiment, after the player generates the redirection request, it could further be determined whether a new redirection request operation is obtained in a predetermined time period. If no new redirection request is obtained, the player uploads this redirection request to the server, or otherwise the player does not upload this redirection request.

Noted that the redirection request operation might be arbitrary, which causes the redirection time contained in the generated redirection request could also be arbitrary and being of some degree offset from the anticipated positioning location. Accordingly, after the player generate a redirection request, if there's no new redirection request operation received within a predetermined time, it would be indicated that the redirection time contained in the redirection request is the actual anticipated time, and that the contents played from the time point is the interested content. Accordingly, the player uploads this redirection request to the server. Otherwise, if the player receives a new redirection request operation within the predetermined time, it is indicated that this redirection time contained in the redirection request is not the anticipated time point, and the player accordingly does not upload the redirection request. Instead, the player generates a new redirection request according to the newly received redirection request operation, and so on.

The step hereby may eliminate the drawbacks that arise from the arbitrariness of the redirection time contained in the redirection request, while makes the redirection time that the server obtained to be more accurate and more oriented.

Step S120, segmenting predetermined time period of the multimedia with predetermined interval to obtain multiple time sections.

In detail, the predetermined time period may be a time period that start or ends with a preset location, and lasts for a preset time. Further, the predetermined interval is predefined, and different predetermined time periods are segmented with correspondingly different predetermined intervals. Preferably, the predetermined time period is segmented into multiple equal time sections through the predetermined interval.

Step S130, obtaining predefined number of time sections that have the most recorded redirection time.

Specifically, the server counts the recorded redirection time, and obtains the number of redirection time for each time section according to the time point of the redirection time and the corresponding time section. Furthermore, the server obtains a number of time sections that have the most recorded redirection times (i.e., a top number of time sections with highest number of recorded redirection times). For example, the predefined number of time sections could be 3, and accordingly three time sections that include the most recorded redirection times can be obtained.

Step S140, recording time points that are corresponding to the predetermined locations of the obtained time sections.

Specifically, after obtaining the time sections in step S130, the time points that are corresponding to the predetermined locations of the obtained time sections are selected. Further, the server records the selected time points, and stores the time points with correspondence to the multimedia tag; wherein the recorded and stored time points corresponding to the multimedia tag are multiple, respectively used for representing the different playing locations of the multimedia.

According to one of the embodiment, the predetermined time period includes a preset title period and/or the credits period.

Specifically, the ending location of the title period can be preset, and the predetermined title period could be the time period between the starting point of the multimedia and this ending location. The starting location of the credits period can also be preset, and the predetermined credits period could be the time period between this starting location and the end of the multimedia.

Furthermore, title period and/or the credits period can be segmented with predetermined interval to be multiple time sections of the title period and/or multiple time sections of the credits period, wherein the predetermined interval here could be preferably set to be 10 seconds.

Moreover, predefined number of time sections of the title period and/or credits period that have the most recorded redirection time corresponding to the multimedia tag can be obtained. Preferably, one time section that has the most redirection time can be obtained. Specifically, the time point of the middle location of the obtained time section can be recorded.

In accordance with other embodiment, the time point of the gravity center of the obtained time section can be recorded. The gravity center is located within the time section in areas that have the most concentrated redirection time. According to one of the embodiment, the position of the gravity center can be calculated through: $[(x_1-a)+(x_2-a)+ \ldots +(x_n-a)]/n$, wherein a is the time point of a starting point of the time section, b is the time point of an ending point of the time section, $x_1, x_2, x_3, \ldots, x_n$ are redirection times that are contained in the time section.

Taking the title period as an example, obtaining a time section that contains the most recorded redirection time that corresponds to a multimedia tag; and recording, corresponding to the multimedia tag, the obtained time point that corresponds to the middle position of the time section. The time point is the ending position of the title (one of the interest points) that needs to be recorded. Likewise, for the credits period, the recorded time point is the starting position of the credits that needs to be recorded (another interest point).

In still another embodiment, the predetermined time period further includes a body period that is between the title period and the credits period. Further, segmenting the body period with predetermined interval, to be multiple time sections of the body period. Herein, the predetermined interval could be preferably set to be 1 minute.

Furthermore, predefined number of time sections of the body period that have the most recorded redirection time corresponding to the multimedia tag can be obtained. The predefined number could be 3. Advanced, recording the time points corresponding to the starting point of the obtained multiple time sections in correspondence with the multimedia tag. The recorded time points are the starting location of the highlights (the third interest points, may be multiple).

According to other embodiments, the time point of the gravity center of the obtained time section can be recorded. The gravity center is located within the time section in areas that have the most concentrated redirection time.

In accordance with other embodiments, the ending time of the title period adding a predetermined time increment to be a first time point; the starting time of the credits period deducting a predetermined time increment to be a second time point; the body period is the time section between the first time point and the second time point.

Beside the boundary of the title period and the credits period, there contains large amount of redirection time that relate to the ending position of the title and the starting position of the credits. In obtaining the starting point of the highlights, the redirection time related to the ending position of the title shall be distinguished from the redirection time related to the starting position of the credits. In detail, adding a predetermined time increment, the ending point of the title period adding the time increment to be the first time point; and the starting point of the credits period deducting the time increment to be the second time point. The body period shall be the time section between the first time point and the second time point. The predetermined time increment could be preferably set to be 30 seconds.

For example, assuming that the ending point of the title period of the multimedia is 0 hour 3 minutes 0 second; and that the starting point of the credits period of the multimedia is 1 hour 50 minutes 0 second; and that the time increment preferably set to be 30 second. The body period could thereby be the time section between the first time point 0 hour 3 minute 30 seconds and the second time point 1 hour 49 minutes 30 seconds.

According to still another embodiment, after recording time points that are corresponding to the predetermined locations of the obtained time sections, it is further included: obtaining the recorded time points, and labelling locations that are corresponding to the recorded time points on the progress bar of the player.

Specifically, when the player loads the multimedia contents, the player obtains the multimedia tag. Further, the player inquires in the server according to the multimedia tag, and obtains time points (all the interest points) that are recorded in the server in correspondence with the multimedia tag. The positions that are mapped with the obtained recorded time points on the progress bar are labelled accordingly. For instance, displaying a dot in the corresponding position.

In accordance with another embodiment, the method for obtaining multimedia point of interest further includes: if the number of the obtained redirection time is larger than a predefined threshold, perform steps S130 and S140 again to update the recorded time points.

Preferably, the predefined threshold is twice the number of the last recorded redirection time. Through updating the time points that the server records, the accuracy of the positions of the interest points obtained could be improved. Thereby the obtained ending position of the title period, the starting position of the credits period and the starting position of the highlights approaches the actual corresponding positions of the multimedia.

Figure 2:
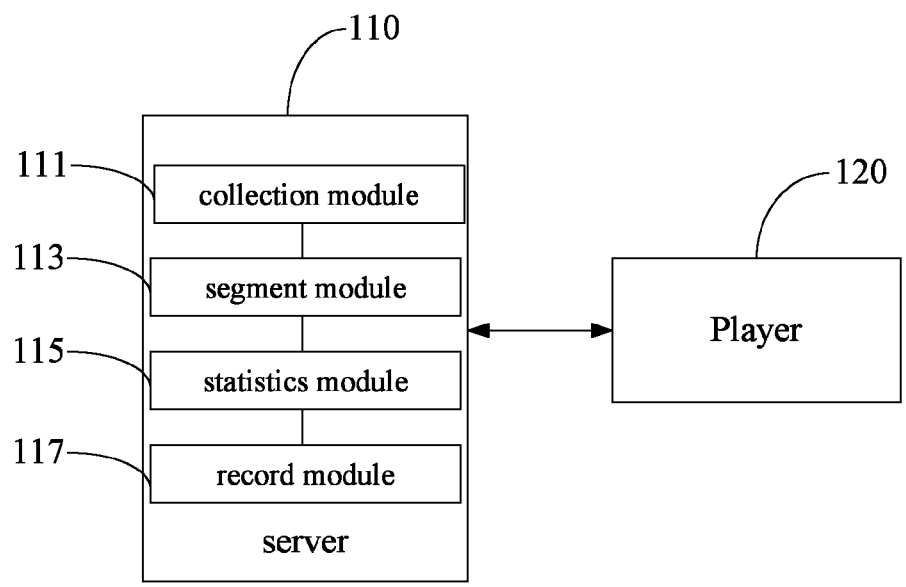
FIG. 2 is a block diagram of a system for obtaining multimedia point of interest according to one of the embodiments.

Referring to FIG. 2, according to another embodiment of the present disclosure, a system for obtaining multimedia point of interest includes a server 110 and a player 120. The server includes a collection module 111, a segment module 113, a statistics module 115, and a record module 117.

The collection module 111 is used for obtaining a redirection request for multimedia, and collecting redirection time which is included in the redirection request.

Specifically, the redirection request may be uploaded through the player 120. The redirection request may be generated through dragging the progress bar configured in the players 120, or be generated through obtaining an inputted redirection time. Moreover, the player 120 obtains the time point on which the progress bar is dragged to, or obtains the redirection time that is inputted. The obtained time is used for labelling the redirection time, the redirection request contains the redirection time.

Furthermore, the redirection request may further contain multimedia tag. The player 120 uploads the redirection request to the server 110, the collection module 111 receives the redirection request and extracts the multimedia tag and the redirection time that is contained in the redirection request, and correspondingly stores the multimedia tag and the redirection time. It shall be appreciated that, the collection module 111 would have obtained large amount of redirection requests; thereby the server have stored large amount of multimedia tags and large amount of redirection time data corresponding to the multimedia tags. Wherein, the multimedia tag is used for uniquely identifying a particular multimedia file, which could be a name of the multimedia, a digest of the multimedia, or an assigned tag number to the multimedia, etc.

According to an exemplary embodiment, after the player 120 generates the redirection request, it could further be determined whether a new redirection request operation is obtained in a predetermined time period. If no new redirection request is obtained, the player 120 uploads this redirection request to the server 110, or otherwise the player 120 does not upload this redirection request.

Noted that the redirection request operation might be arbitrary, which causes the redirection time contained in the generated redirection request could also be arbitrary and being of some degree offset from the anticipated positioning location. Accordingly, after the player 120 generate a redirection request, if there's no new redirection request operation received within a predetermined time, it would be indicated that the redirection time contained in the redirection request is the actual anticipated time, and that the contents played from the time point is the interested content. Accordingly, the player 120 uploads this redirection request to the server 110. Otherwise, if the player 120 receives a new redirection request operation within the predetermined time, it is indicated that this redirection time contained in the redirection request is not the anticipated time point, and the player 120 accordingly does not upload the redirection request. Instead, the player 120 generates a new redirection request according to the newly received redirection request operation, and so on.

Thereby it is possible to eliminate the drawbacks that arise from the arbitrariness of the redirection time contained in the redirection request, while makes the redirection time that the collection module 111 obtained to be more accurate and more oriented.

The segment module 113 is used for segmenting predetermined time period of the multimedia with predetermined interval, to be multiple time sections.

In detail, the predetermined time period may be a time period that start or ends with a preset location, and lasts for a preset time. Further, the predetermined interval is predefined, and different predetermined time periods are segmented with correspondingly different predetermined intervals. Preferably, the predetermined time period is segmented by the segment module 113 into multiple equal time sections through the predetermined interval.

The statistics module 115 is used for obtaining predefined number of time sections that have the most recorded redirection time.

Specifically, the statistics module 115 counts the recorded redirection time, and obtains the number of redirection time for each time section according to the time point of the redirection time and the corresponding time section. Furthermore, the statistics module 115 obtains time sections that have the most recorded redirection time. For example, the predefined number could be 3, and accordingly the statistics module 115 obtains three time sections that include the most recorded redirection time.

The record module 117 is used for recording time points that are corresponding to the predetermined locations of the obtained time sections.

Specifically, after the statistics module 115 obtains the time sections, the record module 117 selects time points that are corresponding to the predetermined locations of the obtained time sections. Further, the record module 117 records the selected time points, and stores the time points with correspondence to the multimedia tag; wherein the record module 117 recorded and stored time points corresponding to the multimedia tag are multiple, respectively used for representing the different playing locations of the multimedia.

According to one of the embodiment, the predetermined time period includes the title period and/or the credits period.

Specifically, the ending location of the title period can be preset, and the predetermined title period could be the time period between the starting point of the multimedia and this ending location. The starting location of the credits period can also be preset, and the predetermined credits period could be the time period between this starting location and the end of the multimedia.

Furthermore, the segment module 113 can segment the title period and/or the credits period with predetermined interval to be multiple time sections of the title period and/or multiple time sections of the credits period, wherein the predetermined interval here could be preferably set to be 10 seconds.

Moreover, the statistics module 115 may obtain predefined number of time sections of the title period and/or credits period that have the most recorded redirection time corresponding to the multimedia tag. Preferably, the statistics module 115 may obtain one time section that has the most redirection time. Specifically, the record module 117 records the time point of the middle location of the obtained time section.

In accordance with other embodiment, the record module 117 may record the time point of the gravity center of the obtained time section. The gravity center is located within the time section in areas that have the most concentrated redirection time. According to one of the embodiment, the position of the gravity center can be calculated through: $[(x_1-a)+(x_2-a)+ \ldots +(x_n-a)]/n$, wherein a is the time point of a starting point of the time section, b is the time point of an ending point of the time section, $x_1, x_2, x_3, \ldots, x_n$ are redirection times that are contained in the time section.

Taking the title period as an example, the statistics module 115 obtains a time section that contains the most recorded redirection time that corresponds to a multimedia tag; and the record module 117 records, corresponding to the multimedia tag, the obtained time point that corresponds to the middle position of the time section. The time point is the ending position of the title (one of the interest points) that needs to be recorded. Likewise, for the credits period, the recorded time point is the starting position of the credits that the record module 117 needs to be recorded (another interest point).

In still another embodiment, the predetermined time period further includes a body period that between the title period and the credits period. Further, the segment module 113 is used for segmenting the body period with predetermined interval, to be multiple time sections of the body period. Herein, the predetermined interval could be preferably set to be 1 minute.

Furthermore, the statistics module 115 may obtain predefined number of time sections of the body period that have the most recorded redirection time corresponding to the multimedia tag. The predefined number could be 3. Advanced, the record module 117 is used for recording the time points corresponding to the starting point of the obtained multiple time sections in correspondence with the multimedia tag. The record module 117 recorded time points are the starting location of the highlights (the third interest points, may be multiple).

According to other embodiments, the record module 117 may be used for recording the time point of the gravity center of the obtained time section. The gravity center is located within the time section in areas that have the most concentrated redirection time.

In accordance with other embodiments, the ending time of the title period adding a predetermined time increment to be a first time point; the starting time of the credits period deducting a predetermined time increment to be a second time point; the body period is the time section between the first time point and the second time point.

Beside the boundary of the title period and the credits period, there contains large amount of redirection time that relate to the ending position of the title and the starting position of the credits. In obtaining the starting point of the highlights, the redirection time related to the ending position of the title shall be distinguished from the redirection time related to the starting position of the credits. In detail, adding a predetermined time increment, the ending point of the title period adding the time increment to be the first time point; and the starting point of the credits period deducting the time increment to be the second time point. The body period shall be the time section between the first time point and the second time point. The predetermined time increment could be preferably set to be 30 seconds.

According to still another embodiment, the player 120 is further used for obtaining the recorded time points that are recorded by the record module 117, and for labelling locations that are corresponding to the recorded time points on the progress bar.

Specifically, when the player 120 loads the multimedia contents, the player 120 obtains the multimedia tag. Further, the player 120 inquires in the server 110 according to the multimedia tag, and obtains time points (all the interest points) that are recorded by the record module 117 in correspondence with the multimedia tag. The positions that are mapped with the obtained recorded time points on the progress bar are labelled accordingly. For instance, displaying a dot in the corresponding position.

In accordance with another embodiment, the server 110 may further include an updating module (not shown). The updating module is used for re-calling the segment module 113 and the statistics module 115 to update the recorded time points if the number of the obtained redirection time is larger than a predefined threshold.

Preferably, the predefined threshold is twice the number of the last recorded redirection time. Through updating the time points that the server records, the accuracy of the positions of the interest points obtained could be improved. Thereby the obtained ending position of the title period, the starting position of the credits period and the starting position of the highlights approaches the actual corresponding positions of the multimedia.

The above described method and system for obtaining multimedia point of interest collects multimedia redirection time that are contained in the obtained redirection requests; segments the predetermined time period of the multimedia with predetermined interval to be multiple time sections; obtains predefined number of time sections that have the most recorded redirection time; and records time points that are corresponding to the predetermined locations of the obtained time sections. Since the time sections that contains the more redirection time would indicate that the users are more interested in the contents of the corresponding multimedia time section, such time points that are corresponding to the predetermined locations of the obtained time sections would be the multimedia points of interest. The redirection time could be collected through obtaining the redirection request, since that the redirection time is included in the redirection requests that are uploaded through the player. There would not be needed to watch the multimedia contents beforehand, thereby reduces operational workloads and improves efficiency for obtaining the multimedia points of interest.

Figure 3:
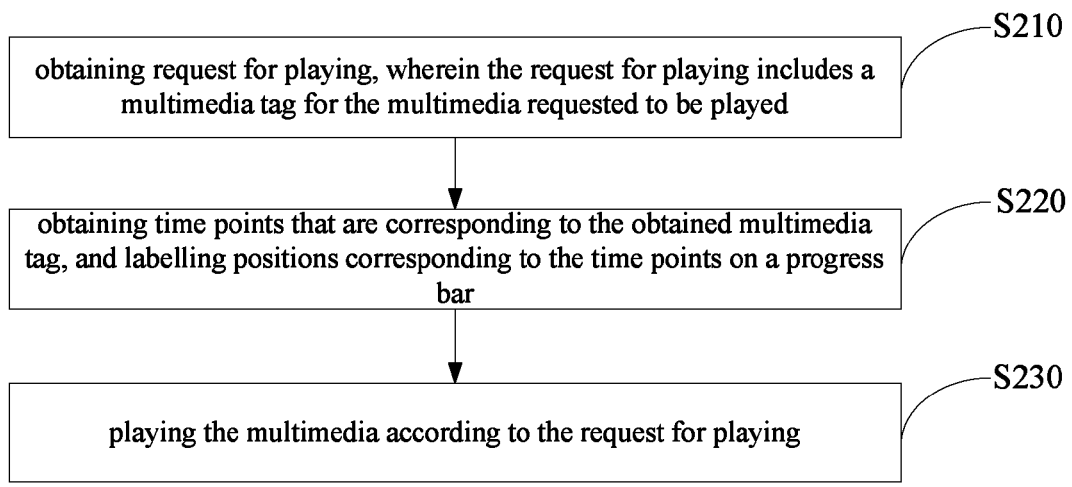
FIG. 3 is a flow diagram of a method for playing multimedia according to one of the embodiments.

Referring to FIG. 3, a method for playing multimedia includes the following step.

Step S210, obtaining request for playing, wherein the request for playing includes a multimedia tag for the multimedia requested to be played.

The multimedia tag is used for uniquely identifying a particular multimedia file, which could be a name of the multimedia, a digest of the multimedia, or an assigned tag number to the multimedia, etc. In detail, the request for playing can be generated through interacting with a particular button on the player interface. For instance, the name and the picture of the multimedia are displayed on the player interface; the request for playing would be generated through clicking the name or the picture, whereby the multimedia tag corresponding to the multimedia is obtained.

Step S220, obtaining time points that are corresponding to the obtained multimedia tag, and labelling positions corresponding to the time points on a progress bar.

In accordance with the present disclosure, the time points are those recorded in the method for obtaining multimedia point of interest; the time points are stored in a server in correspondence with the multimedia tag.

Specifically, after obtaining the multimedia tag, it is inquired in the server according to the multimedia tag, for the time points (the points of interest) that are recorded in correspondence with the multimedia tag. The positions corresponding to the obtained time points are labelled on the progress bar. For instance, displaying a dot in the corresponding position.

Step S230, playing the multimedia according to the request for playing.

Specifically, after obtaining the request for playing, it is obtained the multimedia contents according to the multimedia tag, and the multimedia contents are played accordingly. It shall be appreciated that, in accordance with other embodiments, the multimedia contents can be loaded and cached locally according to the multimedia tag, and be played from a designated position.

According to one of the embodiments, the above step S230 further includes: redirecting to a position corresponding to a time point according to a redirection request, and playing the multimedia from the time point.

Specifically, the request for playing may include redirection request. The redirection request may be generated through dragging the progress bar. Through dragging the progress bar to a labelled position, it would be possible to play the multimedia from the time point corresponding to the labelled position.

In still another embodiment, the above step S230 further includes: loading multimedia contents of a predetermined time section that includes a time point, when the multimedia content is played to a position corresponding to the time point.

In detail, boundary points of the predetermined time section are obtained according to the time point and a length of the predetermined time section. When the multimedia is played to the time point, the multimedia contents between the time point and the boundary points of the predetermined time section are loaded. Preferably, the predetermined time section is a time section that takes the time point as a central point.

When the multimedia is played to the time point, if the multimedia content is not exactly the user interested multimedia content, it would be needed to continue the redirection to find the actual user interested multimedia content. Since there would be no large deviation therebetween, the next redirection time normally locates around the time point. The multimedia content for the new redirection time can be directly obtained from the local cache because the multimedia content for the predetermined time section containing the time point has been loaded previously, while the time for waiting could be saved.

In accordance with another embodiment, the time point may include the ending time point of the title, the starting time point of the credits, and the time points of the highlights. Before the above step S230, the method for playing multimedia further includes: loading multimedia contents between the ending time point of the title and the starting time point of the credits.

For smoother playing, before or during playing, loading user interested multimedia contents to local cache. Specifically, finding positions (title ending position and credits starting position) corresponding to the ending time point of the title and the starting time point of the credits, and downloading multimedia contents taking the title ending position as the starting position, loading the multimedia contents between the title ending position and the credits starting position. The obtained multimedia contents are those that the user is interested in.

Accordingly, when playing multimedia, if it is redirected to a position behind the title ending position, it would be possible to directly read corresponding multimedia contents from the local cache to be played. It is thereby avoided to wait for the buffering after the redirection, while the waiting time could be reduced, playing efficiency and user experience may accordingly be improved.

Figure 4:
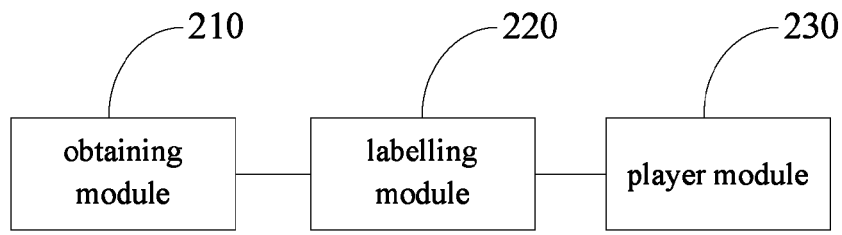
FIG. 4 is a block diagram of an apparatus for playing multimedia according to one of the embodiments.

Referring to FIG. 4, according to an exemplary embodiment of the present disclosure, an apparatus for playing multimedia includes an obtaining module 210, a labelling module 220 and a player module 130.

The obtaining module 210 is used for obtaining request for playing, wherein the request for playing includes a multimedia tag for the multimedia requested to be played.

The multimedia tag is used for uniquely identifying a particular multimedia file, which could be a name of the multimedia, a digest of the multimedia, or an assigned tag number to the multimedia, etc. In detail, the request for playing can be generated through interacting with a particular button on the player interface. For instance, the name and the picture of the multimedia are displayed on the player interface; the request for playing would be generated through clicking the name or the picture, whereby the multimedia tag corresponding to the multimedia is obtained.

The labelling module 220 is used for obtaining time points that are corresponding to the obtained multimedia tag, and labelling positions corresponding to the time points on a progress bar of a player.

In accordance with the present disclosure, the time points are those recorded in the method for obtaining multimedia point of interest; the time points are stored in a server in correspondence with the multimedia tag.

Specifically, after the obtaining module 210 obtains the multimedia tag, the labelling module 220 inquires in the server according to the multimedia tag, for the time points (the points of interest) that are recorded in correspondence with the multimedia tag. The positions corresponding to the obtained time points are labelled on the progress bar. For instance, displaying a dot in the corresponding position.

The player module 230 is used for playing the multimedia according to the request for playing.

Specifically, after obtaining the request for playing, the player module 230 may obtain the multimedia contents according to the multimedia tag, and play the multimedia contents accordingly. It shall be appreciated that, in accordance with other embodiments, the multimedia contents can be loaded and cached locally according to the multimedia tag, and be played from a designated position.

According to one of the embodiments, the player module 230 can be further used for redirecting to a position corresponding to a time point according to a redirection request, and for playing the multimedia from the time point.

Specifically, the request for playing may include redirection request. The redirection request may be generated through dragging the progress bar. Through dragging the progress bar to a labelled position, the player module 230 may play the multimedia from the time point corresponding to the labelled position.

In still another embodiment, the apparatus for playing multimedia may further include a second loading module (not shown). The second loading module is used for loading multimedia contents of a predetermined time section that includes a time point, when the multimedia content is played to a position corresponding to the time point.

In detail, the second loading module obtains boundary points of the predetermined time section according to the time point and a length of the predetermined time section. When the multimedia is played to the time point, the second loading module loads the multimedia contents between the time point and the boundary points of the predetermined time section, taking the time point as the starting point.

When the multimedia is played to the time point, if the multimedia content is not exactly the user interested multimedia content, it would be needed to continue the redirection to find the actual user interested multimedia content. Since there would be no large deviation therebetween, the next redirection time normally locates around the time point. The multimedia content for the new redirection time can be directly obtained from the local cache because the second loading module has previously loaded multimedia content for the predetermined time section containing the time point, while the time for waiting could be saved.

In accordance with another embodiment, the time point may include the ending time point of the title, the starting time point of the credits, and the time points of the highlights. The apparatus for playing multimedia further includes a first loading module; the first loading module is used for loading multimedia contents between the ending time point of the title and the starting time point of the credits.

For smoother playing, before or during playing, the first loading module loads user interested multimedia contents to local cache. Specifically, the first loading module finds positions (title ending position and credits starting position) corresponding to the ending time point of the title and the starting time point of the credits, and downloads multimedia contents taking the title ending position as the starting position, loads the multimedia contents between the title ending position and the credits starting position. The obtained multimedia contents are those that the user is interested in.

Accordingly, when playing multimedia, if it is redirected to a position behind the title ending position, it would be possible to directly read corresponding multimedia contents from the local cache to be played. It is thereby avoided to wait for the buffering after the redirection, while the waiting time could be reduced, playing efficiency and user experience may accordingly be improved.

The method and apparatus for playing multimedia obtain time points that are corresponding to the multimedia tag. The time points are recorded time points according to the above mentioned method and system for obtaining multimedia point of interest. The time points are processed according to large amount of redirection time contained in the collected redirection requests, thereby have accountable accuracy, and the accuracy for labelling the point of interest could be improved.

Those skilled in the art may appreciate that the processes of the above method, whether as a whole or part, may be executed through hardware under instruction of computer programs. The program may be stored in a non-transitory computer readable storage medium while can be executed to perform the process of the method described above. The storage medium could be magnetic disk, optical disk, Read-Only Memory (ROM) or Random Access Memory (RAM), etc.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A method for obtaining a multimedia point of interest for multimedia processed by an apparatus, the method comprising:
    obtaining redirection requests generated by the apparatus for the multimedia, and collecting redirection times included in the redirection requests;
    segmenting at least one time period of the multimedia with a time interval to obtain multiple multimedia time sections for the multimedia;
    obtaining a number of multimedia time sections according to a first threshold from among the multiple multimedia time sections that have most recorded redirection times, according to the collected redirection times for the multimedia section; and
    recording at least one time point corresponding to respective at least one location of the recorded redirection times in the obtained number of multimedia time sections, thereby the recorded at least one time point is representable as processable locations of the multimedia.

2. The method according to claim 1, wherein the at least one time period of the multimedia comprises a title period and/or a credits period.

3. The method according to claim 2, wherein the recording of the at least one time point corresponding to the respective at least one location of the recorded redirection times in the obtained number of multimedia time sections comprises:
    recording a time point corresponding to a respective middle location of the obtained number of multimedia time sections; or
    recording a time point corresponding to a respective center of gravity locations of the recorded redirection times in the obtained number of multimedia time sections.

4. The method according to claim 2, wherein the at least one time period of the multimedia further comprises a body period between the title period and the credits period, and the recording of the at least one time point corresponding to the respective at least one location of the recorded redirection times in the obtained number of multimedia time sections further comprises:
    recording a time point corresponding to a respective starting point of the obtained number of multimedia time sections; or
    recording a time point corresponding to a respective center of gravity of the recorded redirection times for the obtained number of multimedia time sections.

5. The method according to claim 4, further comprising:
    determining a first time point by adding a time increment to an ending time of the title; and
    determining a second time point by deducting a time increment from a starting time of the credits period;
    wherein the body period is a time section between the first time point and the second time point.

6. The method according to claim 1, further comprising:
    after the recording of the at least one time point corresponding to the respective at least one location of the recorded redirection times for the obtained number of multimedia time sections, labeling the respective at least one location corresponding to the at least one recorded time point on a play progress bar displayed by the apparatus as a player for playing the multimedia.

7. The method according to claim 1, wherein the most recorded redirection times is determined according to a second threshold.

8. A system for obtaining a multimedia point of interest for multimedia processed by an apparatus, the system comprising:
    a server including:
        non-transitory computer storage medium to store program(s), and
        computer hardware configured, including configured by the program(s), to implement modules comprising:
            a collection module configured to obtain redirection requests generated by the apparatus for the multimedia, and to collect redirection included in the redirection requests;
            a segment module configured to segment at least one time period of the multimedia with a time interval to obtain multiple multimedia time sections for the multimedia;
            a statistics module configured to obtain a number of multimedia time sections according to a first threshold from among the multiple multimedia time sections that have most recorded redirection times, according to the collected redirection times for the multimedia section;

a record module configured to record at least one time point corresponding to respective at least one location of the recorded redirection times in the obtained number of multimedia time sections, thereby the recorded at least one time point is representable as processable locations of the multimedia.

9. The system according to claim 8, wherein the at least one time period of the multimedia comprises a title period and/or a credits period.

10. The system according to claim 9, wherein the record module is configured:

to record a time point corresponding to a respective middle location of the obtained number of multimedia time sections; or to record a time point corresponding to a respective center of gravity location of the recorded redirection times in the obtained number of multimedia time sections.

11. The system according to claim 9, wherein the at least one time period of the multimedia further comprises a body period between the title period and the credits period, and wherein the record module is further configured:

to record a time point corresponding to a respective starting point location of the obtained number of multimedia time sections; or to record a time point corresponding to a respective center of gravity location of the recorded redirection times in the obtained number of multimedia time sections.

12. The system according to claim 11, wherein the body period is determined according to determining a first time point by adding of a time increment to an ending time of the title period; and determining a second time point by deducting a time increment from a starting time of the credits period deducting; wherein the body period is a time section between the first time point and the second time point.

13. The system according to claim 8, wherein the apparatus is a player configured to obtain the at least one recorded time point, and to label the respective at least one location corresponding to the recorded at least one time point on a play progress bar displayed by the player.

14. The system according to claim 8, wherein the most recorded redirection times is determined according to a second threshold.

15. A method for playing multimedia by an apparatus, comprising:

obtaining requests for playing the multimedia, wherein a request of the requests for playing comprises a multimedia tag for the multimedia requested to be played;

obtaining at least one time point corresponding to the obtained multimedia tag, and labeling at least one position corresponding to the at least one time point on a progress bar displayed for the playing of the multimedia by the apparatus;

wherein the at least one time point is recorded through:

obtaining redirection requests generated by the apparatus for the multimedia, and collecting redirection times included in the redirection requests;

segmenting at least one time period of the multimedia with a time interval to obtain multiple multimedia time sections for the multimedia;

obtaining a number of multimedia time sections according to a first threshold from among the multiple multimedia time sections that have most recorded redirection times, according to the collected redirection times for the multimedia section; and recording the at least one time point corresponding to respective at least one position of the recorded redirection times in the obtained number of multimedia time sections.

16. The method according to claim 15, wherein the at least one time point comprises an ending time point of a title period, a starting time point of a credits period, and time points of a highlights period; and wherein before the playing the multimedia according to the request for playing the multimedia, the method further comprises:

loading multimedia contents of the multimedia corresponding to a position between the ending time point of the title period and the starting time point of the credits period.

17. The method according to claim 15, wherein the multimedia is playable according to the request for playing the multimedia by:

redirecting to a position corresponding to a time point of the at least one time point according to a redirection request, and playing the multimedia from the time point.

18. The method according to claim 15, wherein the multimedia is playable according to the request for playing the multimedia by:

when multimedia content of the multimedia is played to a position corresponding to a time point from among the at least one time point in a time section from among the multiple time sections, loading the multimedia contents of the time section that comprises the time point to a boundary point of the time section.

19. The method according to claim 15, wherein the most recorded redirection times is determined according to a second threshold.

* * * * *